United States Patent Office  3,576,803
Patented Apr. 27, 1971

3,576,803
3-AMINO-2-(AMINOMETHYL)-AR-
NITROPROPIOPHENONES
Malcolm W. Moon, Kalamazoo, Mich., assignor to
The Upjohn Company, Kalamazoo, Mich.
No Drawing. Filed July 5, 1967, Ser. No. 651,111
Int. Cl. C07d 87/40
U.S. Cl. 260—246                     5 Claims

ABSTRACT OF THE DISCLOSURE

Certain new 3-amino-2-(aminomethyl)-Ar-nitropropiophenones are active against bacteria and fungi. The amino groups are broadly selected from disubstituted amino and saturated heterocyclic amino. There may be a second nitro group on the benzene ring as well as alkyl, alkoxy, or halogen. The bean root rot fungus *Fusarium solani f. phaseoli*, and the tomato leaf spot bacterium *Xanthomonas vesicatoria* have been controlled.

SUMMARY OF THE INVENTION

This invention pertains to new organic chemical compounds, a process for preparing the same, new microbiocidal compositions, and a new method for controlling microbes. More particularly, the invention is directed to new 3 - amino - 2 - (aminomethyl) - Ar - nitropropiophenones, a Mannich-type process for preparing the same, new compositions containing the 3-amino-2-(aminomethyl) - Ar - nitropropiophenones for controlling bacteria and fungi, and a new method for controlling bacteria and fungi.

The novel 3 - amino - 2 - (aminomethyl)-Ar-nitropropiophenones of this invention can be represented by the structural formula:

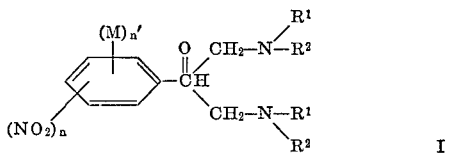

wherein $n$ is an integer 1 or 2; M is alkyl of from 1 to 4 carbon atoms, inclusive, alkoxy of from 1 to 4 carbon atoms, inclusive, or halogen; $n'$ is an integer 0, 1, or 2; and $R^1$ and $R^2$ are substituents more fully described as follows:

Individually, $R^1$ and $R^2$ are alkyl of from 1 to 8 carbon atoms, inclusive, alkenyl of from 3 to 8 carbon atoms, inclusive; aralkyl of from 7 to 13 carbon atoms, inclusive; cycloalkyl of from 3 to 8 carbon atoms, inclusive; cycloalkenyl of from 4 to 8 carbon atoms, inclusive; and Collectively, the

group is a saturated heterocyclic amino group of from 5 to 7 ring atoms, inclusive, having a total of not more than 15 carbon atoms.

DETAILED DESCRIPTION OF THE INVENTION

The new 3 - amino - 2-(aminomethyl)-Ar-nitropropiophenones of this invention are represented in Formula 1, above, in the free base form. Those skilled in the art, however, will note that the amino groups will associate with the hydrogen ions of a dissociated acid to form stable acid addition salts. Hence, the stable acid addition salts are contemplated as an embodiment of the invention. The acid addition salts are readily prepared, and are a convenient form of the new compounds for many purposes.

Illustratively, acid addition salts afford a convenient means of obtaining the compounds in pure form. The pure free base compounds can be obtained from an acid addition salt by neutralizing the acid addition salt with a base and recovering the free base according to conventional methods. Likewise, the acid addition salts of the invention are a convenient means of obtaining the compounds in crystalline form, and for minimizing decomposition of the free bases.

Acid addition salts are also a convenient form of the compounds of the invention for assuring solubility in aqueous media. This quality of the acid addition salts can be especially important in combatting fungi and bacteria on animals, plants, and soil. All acid addition salts are useful as fungicides and bactericides as long as the acid anion does not interfere with the desired effect of the free base.

The new 3 - amino - 2 - (aminomethyl)-Ar-nitropropiophenones form both mono- and diacid addition salts, the hydrochlorides and dihydrochlorides being representative, readily preparable, and preferred. The hydrochlorides are obtained by using hydrochloric acid or anhydrous hydrogen chloride. Other representative mineral acid addition salts are the hydrobromides, the hydroiodides, the sulfates, the phosphates, the hexafluorophosphates, the nitrates, the arsenates, and the fluosilicates. Representative organic acid addition salts are the acetates, the propionates, the benzoates, the salicylates, the glycolates, the succinates, the nicotinates, the tartrates, the maleates, the malates, the oxalates, the pamoates, the methanesulfonates, the dodecylbenzenesulfonates, the picrates, the arsanilates, and the lactates.

The fluosilicic acid addition salts of the 3-amino-2-(aminomethyl)-Ar-nitropropiophenones of this invention are useful as mothproofing agents in accordance with U.S. Patents 1,915,334 and 2,075,359. The thiocyanic acid addition salts are useful for condensing with formaldehyde in accordance with U.S. Patents 2,425,320 and 2,606,155 to form amine thiocyanateformaldehyde condensation products for use as pickling inhibitors.

The new 3-amino-2-(aminomethyl) - Ar - nitropropiophenones of Formula 1 and acid addition salts are active against microorganisms, particularly fungi and bacteria. Hence, the compounds can be used in the novel compositions of this invention to control fungi and bacteria on organic matter such as wood, cellulosic fibers, leather, seeds, fruits, and vegetables; living plants; soil; and on animals such as fish, reptiles, birds, cattle, horses, dogs, cats, and other animals. The invention provides, therefore, a new means of controlling fungi and bacteria in general as well as specific fungi and bacteria that are pathogenic to seeds, plants, and animals. In particular, compounds of this invention have been found to be effective against the bean root rot fungus, *Fusarium solani f. phaseoli* and tomato leaf spot bacterium, *Xanthomonas vesicatoria*. Illustratively, an effective compound against both organisms is 3-morpholino-2-(morpholinomethyl)-3'-nitropropiophenone.

Other fungi against which the compounds of this invention have been found to be active include: *Botrytis cinerea, Fusarium oxysporum, Monolinia fructicola, Pythium debaryanum, Stemphyllium species, Blastomyces dermatitidis, Coccidioides immitis, Histoplasma capsulatum, Trychophyton rubrum, Trichophyton violaceum,* and *Trichophyton metagrophytes*.

The compounds of the invention are also active against the bacterium *Erwinia amylovora*. Some of the compounds have moderate herbicidal activity.

The compounds of Formula I constitute a significant number of new chemical compounds. Many more, in fact, than those skilled in the art will readily perceive. Hence, in order to facilitate comprehension of the scope of this invention, certain descriptive terms will be defined and illustrative examples will be specified so that those skilled in the art can more readily recognize the metes and bounds of the invention.

The term "lower-alkoxy" means methoxy, ethoxy, propoxy, isopropoxy, butoxy, isobutoxy, sec-butoxy, and tert-butoxy.

The phrase "alkyl of from 1 to 8 carbon atoms, inclusive," includes for example, methyl, ethyl, propyl, butyl, pentyl, hexyl, heptyl, octyl, and isomeric forms thereof.

The phrase "alkenyl of from 3 to 8 carbon atoms, inclusive," includes for example, allyl, 1-methallyl, 2-methallyl, 2-butenyl(crotyl), 3-butenyl, 1,2-dimethallyl, 2-ethylallyl, 1-methyl-2-butenyl, 2-methyl-2-butenyl, 3-methyl-2-butenyl, 3-pentenyl, 2,3-dimethyl-2-butenyl, 1,3-dimethyl-2-butenyl, 1-ethyl-2-butenyl, 4-methyl-2-pentenyl, 2-ethyl-2-pentenyl, 4,4-dimethyl-2-pentenyl, 2-heptenyl, 2-octenyl, 5-octenyl, 1,4-dimethyl-4-hexenyl, and the like.

The phrase "aralkyl of from 7 to 13 carbon atoms, inclusive," includes for example, benzyl, phenethyl, 1-phenylethyl, 2-phenylpropyl, 4-phenylbutyl, 6-phenylhexyl, 5-phenyl-2-methylpentyl, benzhydryl, 1-naphthylmethyl, 2-(1-naphthyl)ethyl, 2-(2-naphthyl)ethyl, and the like.

The phrase "cycloalkyl of from 3 to 8 carbon atoms, inclusive," includes for example, cyclopropyl, 2-methylcyclopropyl, 2,2-dimethylcyclopropyl, 2,3-diethylcyclopropyl, 2-butylcyclopropyl, cyclobutyl, 2-methylcyclobutyl, 3-propylcyclobutyl 2,3,4-trimethylcyclobutyl, cyclopentyl, 2,2-dimethylcyclopentyl, cyclohexyl, 3-methylcyclohexyl, 2,2-dimethylcyclohexyl, cycloheptyl, cyclooctyl, and the like.

The phrase "cycloalkenyl of from 4 to 8 carbon atoms, inclusive," includes for example, 2-cyclobutenyl, 3-cyclopentenyl, 3-cyclohexenyl, 2-ethyl-3-cyclohexenyl, and the like.

The phrase "saturated heterocyclic amino group of from 5 to 7 ring atoms, inclusive, having a total of not more than 15 carbon atoms," includes for example, pyrrolidinyl, lower-alkylpyrrolidinyl, for example, 2-methylpyrrolidinyl, 3-butylpyrrolidinyl, 3-tert-butylpyrrolidinyl, and 2-isohexylpyrrolidinyl, polylower-alkylpyrrolidinyl, for example, 2,3-dimethylpyrrolidinyl, 2,2-dimethylpyrrolidinyl, 2,5-diethylpyrrolidinyl, and 2,3,5-trimethylpyrrolidinyl, piperidino, lower-alkylpiperidino, for example, 2-methylpiperidino, 3-methylpiperidino, 4-methylpiperidino, 3-isopropylpiperidino, and 4-tert-butylpiperidino, polylower-alkylpiperidino, for example, 3,4-diethylpiperidino, 2-methyl-5-ethylpiperidino, 3,5-dipentylpiperidino, 2,4,6-trimethylpiperidino, and 2,3,5-triethylpiperidino, hexamethyleneimino, lower-alkylhexamethyleneimino, for example, 2-ethylhexamethyleneimino, 4-tert-butylhexamethyleneimino, and 3-heptylhexamethyleneimino, polylower-alkylhexamethyleneimino, for example, 2,4-dimethylhexamethyleneimino, 3,3-dimethylhexamethyleneimino, and 2,4,6-tripropylhexamethyleneimino, 4-lower-alkylpiperazinyl, for example, 4-methylpiperazinyl and 4-isopropylpiperazinyl, polylower-alkylpiperazinyl, for example, 2,4,5-trimethylpiperazinyl, morpholino, lower-alkylmorpholino, for example, 2-ethylmorpholino and 3-isobutylmorpholino, polylower-alkylmorpholino, for example, 2-ethyl-5-methylmorpholino and 3,3-dimethylmorpholino, thiamorpholino, lower-alkylthiamorpholino, for example, 3-methylthiamorpholino, and polylower-alkylthiamorpholino, for example, 2,3,6-trimethylthiamorpholino and 2,3,5,6-tetramethylthiamorpholino.

The foregoing specified and many other like saturated heterocyclic amino groups are contemplated as being within the scope of this invention. It will be noted that the saturated amino heterocycle can be other than cycloalkyleneimino and there can be a second hetero atom in the ring, i.e., an oxygen atom, a sulfur atom, or a second nitrogen atom as a ring member.

Accordingly, a further definition of the phrase is:

Collectively, $R^1$ and $R^2$ taken as a unit with the $-N<$ atom is a saturated heterocyclic amino group of from 5 to 7 ring atoms, inclusive, having a total of not more than 15 carbon atoms, one of the ring atoms being selected from carbon, oxygen, sulfur, or a second nitrogen atom so that $R^1-R^2$ as a unit is alkylene, oxadialkylene, thiadialkylene, or N-alkylazadialkylene, respectively.

The new 3-amino-2-(aminomethyl)-Ar-nitropropiophenones of this invention (compounds of Formula I) can be prepared by a Mannich reaction as described in U.S. Patent No. 3,058,987. According to the method, an Ar-nitroacetophenone, a secondary amine acid addition salt, and paraformaldehyde are reacted in the presence of acid, e.g., hydrochloric acid, in an inert organic solvent, e.g., ethanol. This reaction produces an Ar-nitro-3-aminopropiophenone acid addition salt (a mono-Mannich base), i.e. one aminomethyl group is introduced on the 2-carbon atom of the acetophenone. The second aminomethyl group is introduced by reacting the Ar-nitro-3-aminopropiophenone with a secondary amine and formaldehyde in a basic reaction medium (in the presence of a solvent such as ethanol). According to the method of the patent, the Ar-nitro-3-aminopropiophenone is used in the form of an acid addition salt and a basic reaction medium is assured by employing an excess of amine (but sodium hydroxide is also suggested).

Alternatively, the 3-amino-2-(aminomethyl)-Ar-nitropropiophenones of Formula I can be readily prepared in a one-step synthesis, without the necessity of separating the Ar-nitro-3-aminopropiophenone intermediate by reacting the Ar-nitroacetophenone, the secondary amine, and the formaldehyde in a lower-alkanoic acid reaction medium. Glacial acetic acid is a preferred lower-alkanoic acid, but propionic and butyric acid can be used. The reaction proceeds at temperatures in the range of about 30° to about 160° C., but temperatures in the range of about 80° to about 120° C. are preferred. Two or more molar equivalents of the secondary amine are used. Formaldehyde is used in excess.

The desired 3-amino-2-(aminomethyl)-Ar-nitropropiophenone product is recovered from the reaction mixture by conventional methods such as by removing the reaction medium and volatile components by evaporation, or by extracting the free base product with suitable organic solvents after neutralizing the acid. Suitable organic solvents for the extraction are ether and chloroform. When the product separates from the reaction mixture as a solid, the mixture can be filtered and the filter cake washed or redissolved and crystallized. The free bases can be conveniently recovered in the form of acid addition salts.

The new 3-amino-2-(aminomethyl)-Ar-nitropropiophenones of Formula I can also be prepared by a new process wherein no acid catalyst is employed. According to this new method, the appropriate Ar-nitroacetophenone is heated with an excess of a secondary amine free base in the presence of aqueous formaldehyde. The desired 3-amino-2-(aminomethyl)-Ar-nitropropiophenone is recovered from the reaction mixture by conventional methods.

Advantageously, the reaction mixture is cooled, extracted with an organic solvent, e.g., technical hexane, ether, benzene, toluene, and like solvents; and the desired product is recovered from the extract by evaporating or distilling the solvent, or by crystallization. Alternatively, the reaction mixture can be set aside and the water phase separated from the oily phase containing the desired product. The oily phase is washed, dried, and chilled to effect crystallization of the product.

The following examples are illustrative of the process and products of the present invention, but are not to be construed as limiting.

EXAMPLE 1

*Preparation of 3-morpholino-2-(morpholinomethyl)-3'-nitropropiophenone and dihydrochloride thereof*

PART A.—3-MORPHOLINO-3'-NITROPROPIOPHENONE HYDROCHLORIDE 3-morpholino-3'-nitropropiophenone hydrochloride was prepared by reacting 3'-nitroacetophenone with morpholine hydrochloride and paraformaldehyde in the presence of ethanol and hydrochloric acid, in accordance with the procedure of U.S. Pat. 3,058,987.

PART B.—3 - MORPHOLINO-2-(MORPHOLINOMETHYL)-3'-NITROPROPIOPHENONE AND DIHYDROCHLORIDE THEREOF

A mixture consisting of 23.2 g. of 3-morpholino-3'-nitropropiophenone hydrochloride (part A, above), 9.1 g. of 37% aqueous formaldehyde, 13.2 g. morpholine, and 150 ml. ethanol was heated at the reflux temperature for 1 hr. After removing the ethanol by evaporation under reduced pressure, the residue thus obtained was dispersed in 100 ml. water basified with 45 ml. 2 N aqueous sodium hydroxide. The alkaline aqueous solution was extracted with two 150-ml. portions of ether, and the combined ether extract was washed with water and dried. The ether was removed by evaporation and the gum thus obtained was crystallized from a mixture of technical hexane and acetone. After recrystallizing from methanol, the 3-morpholino-2-(morpholinomethyl)-3'-nitropropiophenone had a melting point of 105° to 107° C.

*Analysis.*—Calcd. for $C_{18}H_{25}N_3O_5$ (percent): C, 59.49); H, 6.39; N, 11.56. Found (percent): C, 59.53; H, 7.25; N, 11.41.

An acetone solution of 3-morpholino-2-(morpholinomethyl)-3'-nitropropiophenone was acidified with a slight excess of methanolic hydrogen chloride. There was thus obtained 3 - morpholino - 2-(morpholinomethyl)-3'-nitropropiophenone dihydrochloride which was recovered by filtration and dried.

EXAMPLE 2

*Preparation of 3-morpholino-2-(morpholinomethyl)-4'-nitropropiophenone*

Following the procedure of Example 1, Parts A and B, but substituting 4'-nitroacetophenone for 3'-nitroacetophenone, there were prepared the corresponding 3-morpholino-4'-nitropropiophenone hydrochloride and 3-morpholino-2-(morpholinomethyl)-4'-nitropropiophenone having a melting point of 80° to 82° C.

*Analysis.*—Calcd. for $C_{18}H_{25}N_3O_5$ (percent): C, 59.49; H, 6.93. Found (percent): C, 59.57; H, 7.08.

EXAMPLE 3

Following the procedure of Example 1, Parts A and B, but substituting the hydrochlorides of dimethylamine, diethylamine, dipropylamine, diallylamine, N-methylbenzylamine, N - methylcyclopentylamine, N - methyl - 2-cyclohexenylamine, pyrrolidine, 2 - methylpyrrolidine, 2-sec-butylpyrrolidine, 3,4-dibutylpyrrolidine, 3,4-dimethylpyrrolidine, piperidine, 3,4-diethylpiperidine, 3,5-dipentylpiperidine, 2 - ethyl - 5-methylmorpholine, 4-methylpiperazine, 2,4,5-trimethylpiperazine, 2,6-dimethylmorpholine, thiamorpholine, 3-methylmorpholine, 2,3,5,6-tetramethylthiamorpholine, 4-butylpiperazine, hexamethyleneimine, 2-ethylhexamethyleneimine, 2,4 - dimethylhexamethyleneimine, 2,4,6-tripropylhexamethyleneimine, and 3-heptylhexamethyleneimine for morpholine hydrochloride in Part A, and substituting the corresponding free bases for morpholine in Part B, there were prepared the corresponding 3-dimethylamino-2-[(dimethylamino)methyl]-3'-nitrophenone,
3-diethylamino-2-[(diethylamino)methyl]-3'-nitropropiophenone,
3-dipropylamino-2-[(dipropylamino)methyl]-3'-nitropropiophenone,
3-diallylamino-2-[(diallylamino)methyl]-3'-nitropropiophenone,
3-(N-methylbenzylamino)-2-[(N-methylbenzylamino)methyl]-3'-nitropropiophenone,
3-(N-methylcyclopentylamino)-2-[(N-methylcyclopentylamino)-methyl]-3'-nitropropiophenone,
3-(N-methyl-2-cyclohexenylamino)-2-[(N-methyl-2-cyclohexenylamino)methyl]-3'-nitropropiophenone,
3-pyrrolidino-2-(pyrrolidinomethyl)-3'-nitropropiophenone,
3-(2-methylpyrrolidino)-2-[(2-methylpyrrolidino)methyl]-3'-nitropropiophenone,
3-(2-sec-butylpyrrolidino)-2-[(2-sec-butylpyrrolidino)methyl]-3'-nitropropiophenone,
3-(3,4-dibutylpyrrolidino)-2-[(3,4-dibutylpyrrolidino)methyl]-3'-nitropropiophenone,
3-(3,4-dimethylpyrrolidino)-2-[(3,4-dimethylpyrrolidino)methyl]-3'-nitropropiophenone,
3-piperidino-2-(piperidinomethyl)-3'-nitropropiophenone,
3-(3,4-diethylpiperidino)-2-[(3,4-diethylpiperidino)methyl]-3'-nitropropiophenone,
3-(3,5-dipentylpiperidino)-2-[(3,5-dipentylpiperidino)methyl]-3'-nitropropiophenone,
3-(2-ethyl-5-methylmorpholino)-2-[(2-ethyl-5-methylmorpholino)methyl]-3'-nitropropiophenone,
3-(4-methylpiperazinyl)-2-[(4-methylpiperazinyl)methyl]-3'-nitropropiophenone,
3-(2,4,5-trimethylpiperazinyl)-2-[(2-4,5-trimethylpiperazinyl)methyl]-3'-nitropropiophenone,
3-(2,6-dimethylmorpholino)-2-[(2,6-dimethylmorpholino)methyl]-3'-nitropropiophenone,
3-thiamorpholino-2-(thiamorpholino-methyl)-3'-nitropropiophenone,
3-(3-methylmorpholino)-2-[(3-methylmorpholino)methyl]-3'-nitropropiophenone,
3-(2,3,5,6-tetramethylthiamorpholino)-2-[(2,3,5,6-tetramethylthiomorpholino)methyl]-3'-nitropropiophenone,
3-(4-butylpiperazinyl)-2-[(4-butylpiperazinyl)methyl]-3'-nitropropiophenone,
3-hexamethyleneimino-2-(hexamethyleneiminomethyl)-3'-nitropropiophenone,
3-(2-ethylhexamethyleneimino)-2-[(2-ethylhexamethyleneimino)methyl]-3'-nitropropiophenone,
3-(2,4-dimthylhexamethyleneimino)-2-[(2,4-dimethylhexamethyleneimino)methyl]-3'-nitropropiophenone,
3-(2,4,6-tripropylhexamethyleneimino)-2-[(2,4,6-tripropylhexamethyleneimino)methyl]-3'-nitropropiophenone, and
3-(3-heptylhexamethyleneimino)-2-[(3-heptylhexamethyleneimino)methyl]-3'-nitropropiophenone, respectively.

EXAMPLE 4

Following the procedure of Example 1, Part A, but substituting

2'-methyl-5'-nitroacetophenone,
3'-methyl-5'-nitroacetophenone,
2'-nitro-4'-methylacetophenone,
2'-nitro-4',5'-dimethylacetophenone,
2'-nitro-5'-methoxyacetophenone,
3'-nitro-4'-methoxyacetophenone,
3'-nitro-4'-chloroacetophenone,
2'-nitro-4'-chloroacetophenone,
2'-nitro-3',4'-dichloroacetophenone, and
3',5'-dinitroacetophenone for 3'-nitroacetophenone, there were prepared the corresponding 2'-methyl-3-morpholino-5'-nitropropiophenone hydrochloride,
3'-methyl-3-morpholino-5'-nitropropiophenone hydrochloride,
4'-methyl-3-morpholino-2'-nitropropiophenone hydrochloride, 4',5'-dimethyl-3-morpholino-2'-nitropropiophenone hydrochloride,
5'-methoxy-3-morpholino-2'-nitropropiophenone hydrochloride,
4'-methoxy-3-morpholino-3'-nitropropiophenone hydrochloride,
4'-chloro-3-morpholino-3'-nitropropiophenone hydrochloride,
4'-chloro-3-morpholino-2'-nitropropiophenone hydrochloride,
3',4'-dichloro-3-morpholino-2'-nitropropiophenone hydrochloride, and
3',5'-dinitro-3-morpholinopropiophenone hydrochloride, respectively.

Following the procedure of Example 1, Part B, but substituting

2'-methyl-3-morpholino-5'-nitropropiophenone hydrochloride,
3'-methyl-3-morpholino-5'-nitropropiophenone hydrochloride,
4'-methyl-3-morpholino-2'-nitropropiophenone hydrochloride,
4',5'-dimethyl-3-morpholino-2'-nitropropiophenone hydrochloride,
5'-methoxy-3-morpholino-2'-nitropropiophenone hydrochloride,
4'-methoxy-3-morpholino-3'-nitropropiophenone hydrochloride,
4'-chloro-3-morpholino-3'-nitropropiophenone hydrochloride,
4'-chloro-3-morpholino-2'-nitropropiophenone hydrochloride,
3',4'-dichloro-3-morpholino-2'-nitropropiophenone hydrochloride, and
3',5'-dinitro-3-morpholinopropiophenone hydrochloride
for
3-morpholino-3'-nitropropiophenone hydrochloride, there were prepared the corresponding 2'-methyl-3-morpholino-2-(morpholinomethyl)-5'-nitropropiophenone,
3'-methyl-3-morpholino-2-(morpholinomethyl)-5'-nitropropiophenone,
4'-methyl-3-morpholino-2-(morpholinomethyl)-2'-nitropropiophenone,
4',5'-dimethyl-3-morpholino-2-(morpholinomethyl)-2'-nitropropiophenone,
5'-methoxy-3-morpholino-2-(morpholinomethyl)-2'-nitropropiophenone,
4'-methoxy-3-morpholino-2-(morpholinomethyl)-3'-nitropropiophenone,
4'-chloro-3-morpholino-2-(morpholinomethyl)-3'-nitropropiophenone,
4'-chloro-3-morpholino-2-(morpholinomethyl)-2'-nitropropiophenone,
3',4'-dichloro-3-morpholino-2-(morpholinomethyl)-2'-nitropropiophenone, and
3',5'-dinitro-3-morpholino-2-(morpholinomethyl)propiophenone, respectively.

The 3-amino-2-(aminomethyl)-Ar-nitropropiophenones (free base compounds of Formula I and acid addition salts thereof) are formulated as fungicides and bactericides with solid and liquid carriers with or without adjuvants. The compounds can be used in pure form, but generally the interest of economy is best served by the formulations of the invention. The pure active compounds or the formulations can be applied to bacteria, fungi, objects, or a situs for preventing fungal and bacterial growths. The microbiocidal formulations of this invention include dispersions in powder and granular carriers, e.g., dusts and granules; dispersions in liquid carriers, e.g., true solutions, suspensions and emulsifiable concentrates; smokes and aerosols; emulsions, e.g., creams and ointments; and capsules and tablets.

The 3-amino-2-(aminomethyl)-Ar-nitropropiophenones can be readily formulated as dusts by grinding a mixture of the compound and a pulverulent carrier in the presence of each other. Grinding is conveniently accomplished in a ball mill, a hammer mill, or by air-blast micronization. A suitable ultimate particle size is less than 60 microns. Preferably, 95% of the particles are less than 50 microns, and about 75% are 5 to 20 microns. Dusts of that degree of comminution are conveniently free-flowing and can be applied to animals, inanimate matter, fruit trees, crop plants, and soil so as to effect thorough distribution and coverage. Dusts are particularly adapted for effectively controlling plant fungi over wide areas when applied by airplane. They are also indicated for application to the undersides of plant foliage and to the skin of hairy animals.

Representative suitable pulverulent carriers include the natural clays such as China, Georgia, Barden, attapulgus, kaolin, and bentonite clays; minerals in their natural forms as they are obtained from the earth such as talc, pyprophyllite, quartz, diatomaceous earth, fuller's earth, chalk, rock phosphates and sulfates, calcium carbonates, sulfur, silica and silicates; chemically modified minerals such as washed bentonite, precipitated calcium phosphate, precipitated calcium carbonate, precipitated calcium silicate, synthetic magnesium silicate, and colloidal silica; and organic flours such as wood, walnut shell, soybean, cottonseed, and tobacco flours, and free-flowing, hydrophobic starches.

Dusts can also be prepared by dissolving the 3-amino-2-(aminomethyl)-Ar-nitropropiophenones in a volatile solvent such as methylene chloride, mixing the solution with a pulverulent carrier and evaporating the solvent.

The proportions of pulverulent carrier and 3-amino-2-(aminomethyl)-Ar-nitropropiophenone can vary over a wide range depending upon the microbes to be controlled and the conditions of treatment. In general, dust formulations can contain up to about 90% (on a weight basis) of the active ingredient. Dusts having as little as 0.001% of the active ingredient can be used, but a generally preferred proportion is from about 0.50% to about 20% of active ingredient.

The dispersible powder formulations of this invention ar prepared by incorporating a surfactant in a dust composition prepared as described above. When about 0.1% to about 12% of a surfactant is incorporated in a dust, the dispersible powder thus obtained is particularly adapted for further admixture with water for spraying on inanimate matter and products, fruit trees, field crops, soil, and livestock. The dispersible powders can be admixed with water to obtain any desired concentration of active ingredient, and the mixture can be applied in amounts sufficient to obtain predetermined rates of application and uniform distribution. With this flexibility in mind, the dispersible powders of the invention can conveniently comprise preferably about 10% to about 80% of active ingredient.

Representative surfactants useful for preparing dispersible powder formulations of this invention include alkyl sulfates and sulfonates, alkyl aryl sulfonates, sulfosuccinate esters, polyoxyethylene sulfates, polyoxyethylenesorbitan monolaurate, alkyl aryl polyether sulfates, alkyl aryl polyether alcohols, alkyl naphthalene sufonates, alkyl quaternary ammonium salts, sulfated fatty acids and esters, sulfated fatty acid amides, glycerol mannitan laurate, polyalkylether condensates of fatty acids, lignin sulfonates, and the like. The preferred class of surfactants includes blends of sulfonated oils and polyalcohol carboxylic acid esters (Emcol H-77), blends of polyoxyethylene ethers and oil-soluble sulfonates (Emcol H-400), blends of alkyl aryl sulfonates and alkylphenoxy polyethoxy ethanols (Tritons X-151, X-161, and X-171), e.g., about equal parts of sodium kerylbenzene sulfonate and isooctylphenoxy polyethoxy ethanol contain about 12 ethoxy groups, and blends of calcium alkyl aryl sulfonates and polyethoxylated vegetable oils (Agrimul N₄S). It will be understood, of course, that the sulfate and sulfonate surfactants suggested above will preferably be used in the form of their soluble salts, for example, their sodium salts. All of these surfactants are capable of reducing the surface tension of water to less than about 40 dynes per centimeter in concentrations of about 1% or less. The dispersible powder compositions can be formulated with a mixture of surfactants of the types indicated if desired.

A suitable dispersible powder formulation is obtained by blending and milling 327 lbs. of Georgia clay, 4.5 lbs. of isooctylphenoxy polyethoxy ethanol (Triton X–100) as a wetting agent, 9 lbs. of polymerized sodium salt of substituted benzoid long-chain sulfonic acid (Daxad 27) as a dispersing agent, and 113 lbs. of active ingredient. The resulting formulation has the following percentage composition (parts herein are by weight unless otherwise specified):

|  | Percent |
|---|---|
| Active ingredient | 25 |
| Isooctylphenoxy polyethoxy ethanol | 1 |
| Polymerized sodium salt of substituted benzoid long-chain sulfonic acid | 2 |
| Georgia clay | 72 |

This formulation, when dispersed in water at the rate of 10 lbs. per 100 gals., gives a spray formulation containing about 0.3% (3000 p.p.m.) active ingredient which can be applied to soil, plant growth media, or turf at the rate of 40 gals. per acre to give a total application of active ingredient of 1 lb. per acre.

If desired, dispersants such as methyl cellulose, polyvinyl alcohol, sodium ligninsulfonates, and the like can be included in the dispersible powder formulations of this invention. Adhesive or sticking agents such as vegetable oils, naturally occurring gums, casein, and others can also be included. Corrosion inhibitors such as epichlorohydrin and antifoaming agents such as stearic acid can also be included.

The granular formulations according to this invention are prepared by permeating a granular carrier with a solution of a 3-amino-2-(aminomethyl)-Ar-nitropropiophenone and then drying the granules. Suitable granular carriers include vermiculite, pyrophyllite, and attapulgite. Suitable solvents include acetone, methyl ethyl ketone, and methylene chloride. A solution of 3-amino-2-(aminomethyl)Ar-nitropropiophenone is sprayed on a granular carrier while the carrier is being mixed and tumbled. The granules are then dried. The granules can range in size from about 10 to about 60 mesh, preferably about 30 to 60 mesh.

The compounds of this invention can be applied to fungi, bacteria, objects, or a situs in aqueous sprays without a solid carrier. Since, however, many of the compounds themselves (particularly the free bases) are relatively insoluble in water, such compounds are preferably dissolved in a suitable inert organic solvent carrier. Advantageously, the solvent carrier is immiscible with water so that an emulsion of the solvent carrier in water can be prepared. If, for example, a water-miscible solvent carrier such as ethanol is used the solvent carrier will dissolve in water and any excess 3-amino-2-(aminomethyl)-Ar-nitropropiophenone will be thrown out of solution. In an oil-in-water emulsion, the solvent phase is dispersed in the water phase and the dispersed phase contains the active ingredient. In this way, uniform distribution of a water insoluble active ingredient is achieved in an aqueous spray. A solvent carrier in which the compounds are highly soluble is desirable so that relatively high concentrations of active ingredient can be obtained. Sometimes, one or more solvent carriers with or without a cosolvent can be used in order to obtain concentrated solutions of the active ingredient, the main consideration being to employ a water-immiscible solvent for the active ingredient that will hold the compound in solution over the range of concentrations useful for preventing fungal and bacterial growths.

The emulsifiable concentrates of the invention are prepared, therefore, by dissolving the active ingredient and a surfactant in a substantially water-immiscible solvent carrier (i.e., a solvent carrier which is soluble in water to the extent of less than 2.5% by volume at temperatures of the order of 20° to 30° C.) for example, cyclohexanone, methyl propyl ketone, summer oils, ethylene dichloride, aromatic hydrocarbons such as benzene, toluene, and xylene, and high-boiling petroleum hydrocarbons such as kerosene, diesel oil, and the like. If desired, a cosolvent such as methyl ethyl ketone, acetone, isopropanol, and the like can be included with the solvent carrier in order to enhance the solubility of the active ingredient. Aqueous emulsions are then prepared by mixing with water to give any desired concentration of active ingredient. The surfactants which can be employed in the aqueous emulsions of the invention are those types noted above. Mixtures of surfactants can be employed, if desired.

Advantageously, the concentration of active ingredient in the emulsifiable concentrates can range from about 5% to about 50% by weight, preferably from about 10% to about 40%. A concentrate comprising 20% (by weight) of the compound dissolved in a water-immiscible solvent of the kind noted above can be admixed with an aqueous medium in the proportions of 13 ml. of concentrate with 1 gal. of medium to give a mixture containing 700 parts of active ingredient per million parts of liquid carrier. Similarly, 1 qt. of a 20% concentrate mixed with 40 gals. of water provides about 1200 p.p.m. (parts per million) of active ingredient. In the same manner, more concentrated solutions of active ingredients can be prepared.

The concentrate compositions of the invention which are intended for use in the form of aqueous dispersions or emulsions can also comprise a humectant, that is to say, an agent which will delay the drying of the composition in contact with material to which it has been applied. Suitable humectants include glycerol, diethylene glycol, solubilized lignins, such as calcium ligninsulfonate, and the like.

The rates of application to fungi, bacteria, objects, or situs will depend upon the species of microbe to be controlled, the presence or absence of desirable living organisms, temperature conditions of treatment, and the method and efficiency of application. In general, fungicidal activity is obtained when the compounds are applied at concentrations of about 10 to about 6000 p.p.m., preferably at concentrations of about 100 to about 1200 p.p.m.

The compositions containing 3-amino-2-(aminomethyl)-Ar-nitropropiophenone according to the invention, can be applied by conventional methods to fungi, bacteria, objects or any situs where control of fungi and bacteria is desired. For example, an area of soil or plants can be treated by spraying wettable powder suspensions, emulsions, or solutions from boom-type power sprayers or from hand-operated knapsack sprayers. Dusts can be applied by power-dusters, or by hand-operated dusters. Creams and ointment formulations can be applied to skin or objects for prolonged protection against the microorganisms.

EXAMPLE 5

A dispersible powder concentrate having the following percentage composition:

|  | Percent |
|---|---|
| 3-morpholino-2-(morpholinomethyl)-3'-nitropropiophenone | 45.8 |
| Polymerized sodium salt of substituted benzoid long-chain sulfonic acid (Daxad 27) | 9.2 |
| Kaolinite | 45.0 | was prepared by mixing 250 gm. 3-morpholino-2-(morpholinomethyl)-3'-nitropropiophenone, 50 gm. of a polymerized sodium salt of substituted benzoid long-chain sulfonic acid (Daxad 27), and 245 gm. of kaolinite. The mixture was milled to a particle size averaging 5 to 30 microns. It was suspended in 10 gals. of water, giving an aqueous spray containing about 6500 parts per million of active ingredient.

EXAMPLE 6

A fine granular formulation having the following percentage composition:

| | Percent |
|---|---|
| 3-morpholino-2-(morpholinomethyl)-4'-nitropropiophenone | 3.7 |
| Vermiculite (30/60 mesh) | 96.3 | was prepared by spraying a solution of 220 gm. of 3-morpholino-2-(morpholinomethyl) - 4' - nitropropiophenone in 1000 ml. of methylene chloride on 5780 gm. of vermiculite (30 to 60 mesh) while the vermiculite was being tumbled and stirred so as to assure even distribution. The methylene chloride was then evaporated, leaving 3-morpholino-2-(morpholinomethyl) - 4' - propiophenone adsorbed on the vermiculite, and the vermiculite was pulverized.

EXAMPLE 7

An emulsifiable concentrate having the following percentage composition:

| | Percent |
|---|---|
| 3-morpholino-2-(morpholinomethyl)-3'-nitropropiophenone | 15.0 |
| Technical alkyl naphthalene boiling at 238° to 293° C. (Velsicol AR50) | 19.7 |
| Xylene | 17.4 |
| Isopropanol | 17.4 |
| Ethylene dichloride | 25.4 |
| Blend of alkyl aryl sulfonates and alkylphenoxy polyethoxy ethanols (Triton X-151) | 5.1 | was prepared by mixing 15.0 lbs. of 3-morpholino-2-(morpholinomethyl)-3'-nitropropiophenone, 19.7 lbs. of Velsicol AR50, 17.4 lbs. of xylene, 17.4 lbs. of isopropanol, 25.4 lbs. of ethylene dichloride, and 5.1 lbs. of Triton X-151.

6.67 lbs. of the concentrate mixed with 10 gals of water gave a spray emulsion containing 11,000 p.p.m. of 3 - morpholino - 2 - (morpholinomethyl) - 3' - nitropropiophenone.

EXAMPLE 8

An emulsifiable concentrate having the following percentage composition:

| | Percent |
|---|---|
| 3-morpholino-2-(morpholinomethyl)-4'-nitropropiophenone | 40.0 |
| Technical alkyl naphthalene boiling at 238° to 293° C. (Celsicol AR50) | 13.7 |
| Xylene | 12.3 |
| Isopropanol | 11.3 |
| Ethylene dichloride | 17.7 |
| Blend of alkyl aryl sulfonates and alkylphenoxy polyethoxy ethanols (Triton X-151) | 5.0 | was prepared by mixing 40.0 lbs. of 3-morpholino-2-(morpholinomethyl)-4'-nitropropiophenone, 13.7 lbs. of Velsicol AR50, 12.3 lbs. of xylene, 11.3 lbs. of isopropanol, 17.7 lbs. of ethylene dichloride, and 5.0 lbs. of Triton X-151.

1.67 lbs. of the concentrate mixed with 10 gals of water gave a spray emulsion containing 8,000 p.p.m. of 3-morpholino-2-(morpholinomethyl)-4'-nitropropiophenone.

EXAMPLE 9

A wettable powder concentrate having the following percentage composition:

| | Percent |
|---|---|
| 3 - morpholino-2-(morpholinomethyl)-3'-nitropropiophenone | 50 |
| Kaolinite clay (finely divided) | 46 |
| Sodium salt of condensed mononaphthalene sulfonic acid (Lomar D) | 4 | was prepared by mixing 50 g. of 3-morpholino-2-(morpholinomethyl)-3'-nitropropiophenol, 46 g. of the kaolinite clay, and 4 g. of Lomar D. The mixture was milled to an average particle size of 5 to 30 microns.

EXAMPLE 10

A granular formulation having the following percentage composition:

| | Percent |
|---|---|
| 3-morpholino-2-(morpholinomethyl) - 3' - nitropropiophenone | 1 |
| Pyrophyllite (30/60 mesh) | 99 | was prepared by dissolving 1.0 lb. of 3-morpholino-2-(morpholinomethyl)-4'-nitropropiophenone in 10.0 l. of ethylene dichloride and spraying the solution on 99.0 lbs. of pyrophyllite. The granules were dried and then packed for use.

I claim:
1. A 3-amino-2-(aminomethyl)-Ar-nitropropiophenone of the formula:

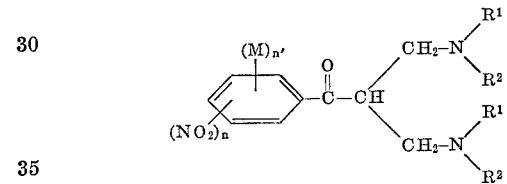

or an acid addition salt thereof, wherein M is alkyl of from 1 to 4 carbon atoms, inclusive, alkoxy of from 1 to 4 carbon atoms, inclusive, or halogen; $n'$ is an integer 0, 1, or 2; $n$ is an integer 1 or 2; and $R^1$ and $R^2$ are alkyl of from 1 to 8 carbon atoms, inclusive; alkenyl of from 3 to 8 carbon atoms, inclusive; aralkyl of from 7 to 13 carbon atoms, inclusive; cycloalkyl of from 3 to 8 carbon atoms, inclusive; cycloalkenyl of from 4 to 8 carbon atoms, inclusive; and together with the attached nitrogen atom form a saturated heterocyclic amino group of from 5 to 7 ring atoms, inclusive, having a total of not more than 15 carbon atoms and no substituents other than alkyls.

2. 3-morpholino-2-(morpholinomethyl)-Ar-nitropropiophenone according to claim 1.

3. 3-amino-2-(aminomethyl) - 3' - nitropropiophenone according to claim 1.

4. 3-morpholino-2-(morpholinomethyl)-3'-nitropropiophenone according to claim 2.

5. 3-morpholino-2-(morpholinomethyl)-4'-nitropropiophenone according to claim 2.

References Cited

UNITED STATES PATENTS 3,058,987  10/1962  Allen _____ 260—294.7

ALEX MAZEL, Primary Examiner

JOSE TOVAR, Assistant Examiner

U.S. Cl. X.R.

260—239, 242, 243, 247, 247.2, 247.5, 268, 271, 293.4, 294, 294.7, 295, 295.5, 326.3, 326.5, 501.17, 501.19, 570.5; 424—248